(12) United States Patent
Sano et al.

(10) Patent No.: US 11,268,214 B2
(45) Date of Patent: Mar. 8, 2022

(54) FILAMENT FOR MATERIAL EXTRUSION 3D PRINTER MOLDING AND PRODUCTION METHOD OF MOLDED BODY

(71) Applicants: MCPP Innovation LLC, Chiyoda-ku (JP); Mitsubishi Chemical Corporation, Chiyoda-ku (JP)

(72) Inventors: Jiro Sano, Mie (JP); Toshihisa Ishihara, Mie (JP); Shigeyuki Furomoto, Tokyo (JP)

(73) Assignees: MCPP Innovation LLC, Chiyoda-ku (JP); Mitsubishi Chemical Corporation, Chiyoda-ku (JP)

( * ) Notice: Subject to any disclaimer, the term of this patent is extended or adjusted under 35 U.S.C. 154(b) by 888 days.

(21) Appl. No.: 15/789,536

(22) Filed: Oct. 20, 2017

(65) Prior Publication Data

US 2018/0038015 A1 Feb. 8, 2018

Related U.S. Application Data

(63) Continuation of application No. PCT/JP2016/062563, filed on Apr. 20, 2016.

(30) Foreign Application Priority Data

Apr. 20, 2015 (JP) .............................. JP2015-085994

(51) Int. Cl.
| | |
|---|---|
| *D01F 6/56* | (2006.01) |
| *D01F 6/42* | (2006.01) |
| *C08L 53/02* | (2006.01) |
| *C08K 5/01* | (2006.01) |
| *C08L 23/02* | (2006.01) |
| *C08L 91/00* | (2006.01) |
| *B29C 64/118* | (2017.01) |
| *C08L 23/14* | (2006.01) |
| *D01F 6/46* | (2006.01) |
| *B33Y 70/00* | (2020.01) |
| *B29K 9/06* | (2006.01) |
| *B29K 23/00* | (2006.01) |
| *B29K 96/04* | (2006.01) |
| *B29K 105/00* | (2006.01) |

(52) U.S. Cl.
CPC ............. *D01F 6/56* (2013.01); *B29C 64/118* (2017.08); *C08K 5/01* (2013.01); *C08L 23/02* (2013.01); *C08L 23/14* (2013.01); *C08L 53/02* (2013.01); *C08L 53/025* (2013.01); *C08L 91/00* (2013.01); *D01F 6/42* (2013.01); *D01F 6/46* (2013.01); *B29K 2009/06* (2013.01); *B29K 2023/12* (2013.01); *B29K 2096/04* (2013.01); *B29K 2105/0085* (2013.01); *B29K 2105/0094* (2013.01); *B29K 2995/007* (2013.01); *B33Y 70/00* (2014.12); *C08L 2203/12* (2013.01)

(58) Field of Classification Search
None
See application file for complete search history.

(56) References Cited

U.S. PATENT DOCUMENTS

| | | | |
|---|---|---|---|
| 5,121,329 | A | 6/1992 | Crump |
| 5,340,433 | A | 8/1994 | Crump |
| 6,722,872 | B1 | 4/2004 | Swanson et al. |
| 6,790,403 | B1 | 9/2004 | Priedeman, Jr. et al. |
| 2001/0030383 | A1 | 10/2001 | Swanson et al. |
| 2001/0038168 | A1 | 11/2001 | Popa et al. |
| 2002/0017743 | A1 | 2/2002 | Priedeman, Jr. |
| 2003/0004600 | A1 | 1/2003 | Priedeman, Jr. |
| 2003/0011103 | A1 | 1/2003 | Swanson et al. |
| 2004/0104515 | A1 | 6/2004 | Swanson et al. |
| 2004/0126452 | A1 | 7/2004 | Swanson et al. |
| 2004/0129823 | A1 | 7/2004 | Swanson et al. |
| 2004/0217517 | A1 | 11/2004 | Swanson et al. |
| 2005/0004282 | A1 | 1/2005 | Priedeman, Jr. et al. |
| 2008/0071030 | A1 | 3/2008 | Priedeman, Jr. |
| 2010/0270707 | A1 | 10/2010 | Priedeman, Jr. et al. |
| 2010/0283172 | A1 | 11/2010 | Swanson |
| 2013/0168892 | A1 | 7/2013 | Swanson |
| 2014/0134335 | A1 | 5/2014 | Pridoehl et al. |
| 2014/0271967 | A1 | 9/2014 | Swanson |
| 2015/0001757 | A1 | 1/2015 | Swanson |
| 2015/0027239 | A1* | 1/2015 | Konkle ................. B29C 64/118 73/862.627 |
| 2015/0210008 | A1 | 7/2015 | Swanson |
| 2016/0108228 | A1 | 4/2016 | Sasaki et al. |

(Continued)

FOREIGN PATENT DOCUMENTS

| | | |
|---|---|---|
| JP | 3-97737 | 4/1991 |
| JP | 3-158228 | 7/1991 |

(Continued)

OTHER PUBLICATIONS

Combined Chinese Office Action and Search Report dated Apr. 11, 2019 in Patent Application No. 201680023116.4, 28 pages (with English translation and English Translation of Category of Cited Documents).

(Continued)

*Primary Examiner* — Robert T Butcher
(74) *Attorney, Agent, or Firm* — Oblon, McClelland, Maier & Neustadt, L.L.P.

(57) ABSTRACT

The present invention provides a filament for material extrusion 3D printer molding, which affords a molded article having soft texture and excellent heat resistance and among others, exhibits good moldability in molding by a material extrusion 3D printer. The present invention relates to a filament for material extrusion 3D printer molding, including a thermoplastic elastomer which contains at least a specific block copolymer and in which the ratio between storage modulus and loss modulus measured at 200° C. and 100 Hz by dynamic viscoelasticity measurement is in a specific range.

30 Claims, 1 Drawing Sheet

(56) References Cited

U.S. PATENT DOCUMENTS

| | | |
|---|---|---|
| 2016/0177078 A1 | 6/2016 | Naito et al. |
| 2016/0236408 A1* | 8/2016 | Wolf .................... B29C 64/209 |
| 2016/0251486 A1 | 9/2016 | Cernohous et al. |
| 2016/0297103 A1* | 10/2016 | Lee .......................... D01F 6/30 |

FOREIGN PATENT DOCUMENTS

| | | |
|---|---|---|
| JP | 2003-502184 | 1/2003 |
| JP | 2003-534159 | 11/2003 |
| JP | 2004-124070 | 4/2004 |
| JP | 2007-51237 | 3/2007 |
| JP | 2007-126531 | 5/2007 |
| JP | 2008-194968 | 8/2008 |
| JP | 2010-521339 | 6/2010 |
| JP | 2011-511719 | 4/2011 |
| WO | WO 01/89714 A1 | 11/2001 |
| WO | WO 01/89814 A1 | 11/2001 |
| WO | WO 2008/112061 A1 | 9/2008 |
| WO | WO 2015/037574 A1 | 3/2015 |
| WO | WO 2015/046524 A1 | 4/2015 |
| WO | WO 2015/054021 A1 | 4/2015 |

OTHER PUBLICATIONS

International Search Report dated Jul. 19, 2016 in PCT/JP2016/062563, filed on Apr. 20, 2016 (with English Translation).

Written Opinion dated Jul. 19, 2016 in PCT/JP2016/062563, filed on Apr. 20, 2016.

"NINJAFLEX™ 3D Printer Filament Revolutionizing the 3D Desktop Printer", NINJAFLEX Press Release for Immediate Release May 1, 2014, http://www.fennerdrives.com/FetchFile.ashx?id=387738c2-1226-44eb-b81a-2334f83be180, 3 pages.

* cited by examiner

FILAMENT FOR MATERIAL EXTRUSION 3D PRINTER MOLDING AND PRODUCTION METHOD OF MOLDED BODY

TECHNICAL FIELD

The present invention relates to a filament for material extrusion 3D printer molding, which affords a molded body having soft texture and excellent heat resistance and among others, exhibits good moldability in molding by a material extrusion 3D printer. The present invention also relates to a roll of the filament, a cartridge for a material extrusion 3D printer, and a production method of a molded body.

BACKGROUND ART

At present, 3D printers of various additive manufacturing systems (for example, a binder ejection system, a material extrusion system, a liquid-tank photopolymerization system) are being sold. Of these, a 3D printer system of a material extrusion system (for example, the system manufactured by Stratasys Inc., U.S.A.) is used for layer-by-layer building of a 3D object by extruding a flowable raw material from a nozzle region provided in an extrusion head, based on the computer-aided design (CAD) model.

Among others, in a Fused Deposition Modeling method (hereinafter, sometimes referred to as FDM method), a raw material in the form of a filament composed of a thermoplastic resin is first inserted into an extrusion head and while being fused by heating, continuously extruded from a nozzle region provided in the extrusion head onto the X-Y plane of a substrate within the chamber. The resin extruded is deposited on and fused to a resin laminate which has already been deposited, and as the resin cools, it solidifies and integrated with the laminate. Because of such a simple system, the FDM method has come to be used extensively.

In a material extrusion 3D printer typified by the FDM method, a 3D object resembling a CAD model is built usually by repeating the extrusion step above with shifting the nozzle position relative to the substrate upward in the Z-axis direction that is a direction perpendicular to the X-Y plane (Patent Documents 1 and 2).

Conventionally, as the raw material used for a material extrusion filament, in view of processability or flowability, an amorphous thermoplastic resin such as acrylonitrile-butadiene-styrene resin (hereinafter, sometimes referred to as "ABS resin") and polylactic acid (hereinafter, sometimes referred to as "PLA resin") has been suitably used in general (Patent Documents 3 to 5).

On the other hand, the ABS resin or PLA resin is generally a rigid material and sometimes cannot meet the requirements that are diversifying day by day. For example, in the case of wishing to model a flexible 3D object such as smartphone cover or container cap, a soft resin is expected as the raw material resin.

As the soft resin applied to molding by a material extrusion three-dimensional printer, a resin made from a urethane thermoplastic elastomer (for example, "NINJAFLEX (registered trademark)", produced by FENNER DRIVES, Inc., USA) has been heretofore marketed (Non-Patent Document 1).

Furthermore, it is disclosed that in addition to the urethane thermoplastic elastomer, a soft resin such as olefin thermoplastic elastomer, polyester thermoplastic elastomer and styrene thermoplastic elastomer can be used in the material extrusion 3D printer (Patent Document 6).

BACKGROUND ART LITERATURE

Patent Document

Patent Document 1: JP-T-2003-502184
Patent Document 2: JP-T-2003-534159
Patent Document 3: JP-T-2010-521339
Patent Document 4: JP-A-2008-194968
Patent Document 5: International Publication No. 2015/037574
Patent Document 6: International Publication No. 2015/054021

Non-Patent Document

Non-Patent Document 1: NINJAFLEX PRESS RELEASE FOR IMMEDIATE RELEASE Contact: Maureen Brennan 312-946-6075, [online], May 1, 2014 [retrieved on Aug. 19, 2014], the Internet <URL:http://www.fennerdrives.com/FetchFile.ashx?id=387738c2-1226-44eb-b81a-2334f83be180>

SUMMARY OF THE INVENTION

Problems that the Invention is to Solve

According to further studies by the inventors of the present invention, the above-described conventional techniques were found to have the following problems.

The ABS resin described in Patent Document 3 is disadvantageous in that a target modeled product having high dimensional accuracy can be hardly obtained because of large warpage after molding and in applications requiring heat resistance, transparency and soft texture, practical properties cannot be satisfied in view of material physical properties. In addition, the PLA resin described in Patent Document 4 is excellent in the dimensional accuracy but is disadvantageous in that the heat resistance is considerably low and deformation is caused due to frictional heat generated in polishing after the modeling.

A filament made from an urethane thermoplastic elastomer, such as "NINJAFLEX (registered trademark)" produced by FENNER DRIVES Inc., USA, was found to have a problem that when supply of the filament to an extrusion head is attempted, the filament tends to bend just before the extrusion head, making the supply difficult, and the preset temperature of the extrusion head must therefore be set high.

Furthermore, when the preset temperature of the extrusion head is low, an appearance failure such as cobwebbing is likely to occur, and also for this reason, the preset temperature of the extrusion head must be set high. In this connection, it was found that when a urethane thermoplastic elastomer is molded under such conditions, a problem such as decrease in the modeling speed or reduction in the modeled product accuracy due to burning, sinking or warpage (deformation or discoloration of the molded article) arises.

Meanwhile, a styrene thermoplastic elastomer has the advantage that the transparency and tactile impression are excellent and among others, high flexibility can be obtained by blending a softening agent for hydrocarbon rubber. However, studies by the inventors of the present invention revealed that when a styrene thermoplastic elastomer is used, the resin may not be sufficiently discharged at the time of extruding the resin by a material extrusion 3D printer and cannot be molded and that although the discharge of the resin can be confirmed, molten resin may not be extruded.

In Patent Documents 2, 5 and 6, although a styrene thermoplastic elastomer is described as a material usable for the filament, the above-described problems are not referred to, and studies for the improvement have been not conducted.

Taking into account various problems in the above-described conventional techniques, an object of the present invention is to provide a filament for material extrusion 3D printer molding, which is excellent in the heat resistance and transparency, has soft texture, and exhibits good moldability in molding by a material extrusion 3D printer under the temperature condition causing no excessive rise of the extrusion processing temperature.

In addition, an object of the present invention is to provide a production method of a molded body with excellent modelability, a roll of the filament, and a cartridge for a material extrusion 3D printer, ensuring that a molded body can be obtained over a wide temperature range without excessively raising the temperature of extrusion processing by a material extrusion 3D printer.

Means for Solving the Problems

As a result of intensive studies to solve those problems, the inventors of the present invention have found that the above-described objects can be achieved by a filament for a material extrusion 3D printer molding, which is composed of a specific thermoplastic elastomer.

That is, the gist of the present invention resides in the following [1] to [40].

[1] A filament for material extrusion 3D printer molding, containing a thermoplastic elastomer which contains at least the following component (A) and in which the ratio (tan δ=G"[200° C., 100 Hz]/G'[200° C., 100 Hz]) between storage modulus (G'[200° C., 100 Hz]) and loss modulus (G"[200° C., 100 Hz]) measured at 200° C. and 100 Hz by dynamic viscoelasticity measurement is from 0.50 to 2.50.

Component (A): at least one block copolymer out of the group consisting of a block copolymer containing at least either one of a polymer block derived from a vinyl aromatic compound and a polymer block derived from conjugated diene and isobutylene, and a block copolymer obtained by hydrogenating the block copolymer.

[2] The filament for material extrusion 3D printer molding according to [1], wherein the thermoplastic elastomer contains the following component (B):

Component (B): a softening agent for hydrocarbon rubber.

[3] The filament for material extrusion 3D printer molding according to [2], wherein the thermoplastic elastomer contains from 30 to 400 parts by weight of the component (B) per 100 parts by weight of the component (A).

[4] The filament for material extrusion 3D printer molding according to any one of [1] to [3], wherein the thermoplastic elastomer contains the following component (C):

Component (C): a polyolefin resin.

[5] The filament for material extrusion 3D printer molding according to [4], wherein a polypropylene resin is contained as the component (C).

[6] The filament for material extrusion 3D printer molding according to [4] or [5], wherein the thermoplastic elastomer contains from 10 to 300 parts by weight of the component (C) per 100 parts by weight of the component (A).

[7] The filament for material extrusion 3D printer molding according to any one of [1] to [6], wherein the filament diameter is from 1.0 to 5.0 mm.

[8] The filament for material extrusion 3D printer molding according to any one of [1] to [7], wherein the storage modulus (G'[30° C., 1 Hz]) of the thermoplastic elastomer measured at 30° C. and 1 Hz by dynamic viscoelasticity measurement is from $1 \times 10^4$ to $5 \times 10^7$ Pa.

[9] The filament for material extrusion 3D printer molding according to [8], wherein the storage modulus (G'[200° C., 1 Hz]) of the thermoplastic elastomer measured at 200° C. and 1 Hz by dynamic viscoelasticity measurement is $2 \times 10^4$ Pa or less.

[10] The filament for material extrusion 3D printer molding according to [9], wherein G'[30° C., 1 Hz]/G'[200° C., 1 Hz] of the thermoplastic elastomer is from $5 \times 10^{-1}$ to $5 \times 10^6$.

[11] The filament for material extrusion 3D printer molding according to any one of [1] to [10], wherein the melt flow rate (MFR) of the thermoplastic elastomer at 190° C. under a load of 1.20 kgf based on ISO 1133 is from 1 to 400 g/10 min.

[12] The filament for material extrusion 3D printer molding according to any one of [1] to [11], wherein the durometer A hardness of the thermoplastic elastomer is 90 or less.

[13] A roll of the filament for material extrusion 3D printer molding according to any one of [1] to [12].

[14] A cartridge for material extrusion 3D printer molding, containing a container having housed therein the filament for material extrusion 3D printer molding according to any one of [1] to [12].

[15] A method for producing a molded article by using a thermoplastic elastomer which contains at least the following component (A) and in which the ratio (tan δ=G"[200° C., 100 Hz]/G'[200° C., 100 Hz]) between storage modulus (G'[200° C., 100 Hz]) and loss modulus (G"[200° C., 100 Hz]) measured at 200° C. and 100 Hz by dynamic viscoelasticity measurement is from 0.50 to 2.50, wherein the filament is molded by a material extrusion 3D printer.

Component (A): at least one block copolymer out of the group consisting of a block copolymer containing at least either one of a polymer block derived from a vinyl aromatic compound and a polymer block derived from conjugated diene and isobutylene, and a block copolymer obtained by hydrogenating the block copolymer.

[16] The method for producing a molded article according to [15], wherein the thermoplastic elastomer contains the following component (B):

Component (B): a softening agent for hydrocarbon rubber.

[17] The method for producing a molded article according to [16], wherein from 30 to 400 parts by weight of the component (B) is used per 100 parts by weight of the component (A).

[18] The method for producing a molded article according to any one of [15] to [17], wherein the thermoplastic elastomer contains the following component (C):

Component (C): a polyolefin resin.

[19] The method for producing a molded article according to [18], wherein a polypropylene resin is contained as the component (C).

[20] The method for producing a molded article according to [18] or [19], wherein from 10 to 300 parts by weight of the component (C) is used per 100 parts by weight of the component (A).

[21] The method for producing a molded article according to any one of [15] to [20], wherein the filament diameter is from 1.0 to 5.0 mm.

[22] The method for producing a molded article according to any one of [15] to [21], wherein the storage modulus (G'[30° C., 1 Hz]) of the thermoplastic elastomer measured at 30° C. and 1 Hz by dynamic viscoelasticity measurement is from $1\times10^4$ to $5\times10^7$ Pa.

[23] The method for producing a molded article according to [22], wherein the storage modulus (G'[200° C., 1 Hz]) of the thermoplastic elastomer measured at 200° C. and 1 Hz by dynamic viscoelasticity measurement is $2\times10^4$ Pa or less.

[24] The method for producing a molded article according to [23], wherein G'[30° C., 1 Hz]/G'[200° C., 1 Hz] of the thermoplastic elastomer is from $5\times10^{-1}$ to $5\times10^6$.

[25] The method for producing a molded article according to any one of [15] to [24], wherein the melt flow rate (MFR) of the thermoplastic elastomer at 190° C. under a load of 1.20 kgf based on ISO 1133 is from 1 to 400 g/10 min.

[26] The method for producing a molded article according to any one of [15] to [25], wherein the durometer A hardness of the thermoplastic elastomer is 90 or less.

[27] The method for producing a molded article according to any one of [15] to [26], wherein the temperature of molten resin discharged from the extrusion head of the material extrusion 3D printer is from 180 to 250° C.

[28] The method for producing a molded article according to any one of [15] to [27], wherein the molding by the material extrusion 3D printer is based on a fused deposition modeling method.

[29] The method for producing a molded article according to any one of [15] to [28], wherein the molding by the material extrusion 3D printer is performed by discharging a molten resin from the extrusion head in a strand shape with a diameter of 0.01 to 1 mm.

[30] Use of a thermoplastic elastomer which contains at least the following component (A) and in which the ratio (tan δ=G"[200° C., 100 Hz]/G'[200° C., 100 Hz]) between storage modulus (G'[200° C., 100 Hz]) and loss modulus (G"[200° C., 100 Hz]) measured at 200° C. and 100 Hz by dynamic viscoelasticity measurement is from 0.50 to 2.50, for a filament for material extrusion 3D printer molding:

Component (A): at least one block copolymer out of the group consisting of a block copolymer containing at least either one of a polymer block derived from a vinyl aromatic compound and a polymer block derived from conjugated diene and isobutylene, and a block copolymer obtained by hydrogenating the block copolymer.

[31] Use of the thermoplastic elastomer for a filament for material extrusion 3D printer molding according to [30], wherein the thermoplastic elastomer contains the following component (B):

Component (B): a softening agent for hydrocarbon rubber.

[32] Use of the thermoplastic elastomer for a filament for material extrusion 3D printer molding according to [31], wherein the thermoplastic elastomer contains from 30 to 400 parts by weight of the component (B) per 100 parts by weight of the component (A).

[33] Use of the thermoplastic elastomer for a filament for material extrusion 3D printer molding according to any one of [30] to [32], wherein the thermoplastic elastomer contains the following component (C):

Component (C): a polyolefin resin.

[34] Use of the thermoplastic elastomer for a filament for material extrusion 3D printer molding according to [33], wherein a polypropylene resin is contained as the component (C).

[35] Use of the thermoplastic elastomer for a filament for material extrusion 3D printer molding according to [33] or [34], wherein the thermoplastic elastomer contains from 10 to 300 parts by weight of the component (C) per 100 parts by weight of the component (A).

[36] Use of the thermoplastic elastomer for a filament for material extrusion 3D printer molding according to any one of [30] to [35], wherein the storage modulus (G'[30° C., 1 Hz]) of the thermoplastic elastomer measured at 30° C. and 1 Hz by dynamic viscoelasticity measurement is from $1\times10^4$ to $5\times10^7$ Pa.

[37] Use of the thermoplastic elastomer for a filament for material extrusion 3D printer molding according to [36], wherein the storage modulus (G'[200° C., 1 Hz]) of the thermoplastic elastomer measured at 200° C. and 1 Hz by dynamic viscoelasticity measurement is $2\times10^4$ Pa or less.

[38] Use of the thermoplastic elastomer for a filament for material extrusion 3D printer molding according to [37], wherein G'[30° C., 1 Hz]/G'[200° C., 1 Hz] of the thermoplastic elastomer is from $5\times10^{-1}$ to $5\times10^6$.

[39] Use of the thermoplastic elastomer for a filament for material extrusion 3D printer molding according to any one of [30] to [38], wherein the melt flow rate (MFR) of the thermoplastic elastomer at 190° C. under a load of 1.20 kgf based on ISO 1133 is from 1 to 400 g/10 min.

[40] Use of the thermoplastic elastomer for a filament for material extrusion 3D printer molding according to any one of [30] to [39], wherein the durometer A hardness of the thermoplastic elastomer is 90 or less.

Effect of the Invention

According to the present invention, a filament for material extrusion 3D printer molding, which exhibits excellent moldability in molding by a material extrusion 3D printer, is provided. In addition, a method for producing a molded body with good moldability by a material extrusion 3D printer can be provided.

MODE FOR CARRYING OUT THE INVENTION

Embodiments of the method of the present invention for producing a molded body are described in detail below. The present invention is not limited to the following explanations and can be implemented by arbitrarily making a modification without departing from the gist of the invention. Here, in the present description, the expression including "to" interposed between numerical values or property values is used including the values on both sides thereof.

[Filament for Material Extrusion 3D Printer Molding]

The filament for material extrusion 3D printer molding of the present invention is a filament for material extrusion 3D printer molding composed of a thermoplastic elastomer which contains the following component (A) and in which the ratio (tan δ=G"[200° C., 100 Hz]/G'[200° C., 100 Hz]) between storage modulus (G'[200° C., 100 Hz]) and loss modulus (G"[200° C., 100 Hz]) measured at 200° C. and 100 Hz by dynamic viscoelasticity measurement is from 0.50 to 2.50.

Component (A): At least one block copolymer out of the group consisting of a block copolymer containing at least either one of a polymer block derived from a vinyl aromatic compound and a polymer block derived from conjugated diene and isobutylene, and a block copolymer obtained by hydrogenating the block copolymer.

From the viewpoint of controlling the value of tan δ and improving the moldability in molding by a material extrusion 3D printer, the thermoplastic elastomer for use in the present invention preferably contains the following components (B) and (C):

Component (B): a softening agent for hydrocarbon rubber, and

Component (C): a polyolefin resin.

[Physical Properties of Thermoplastic Elastomer]

In the thermoplastic elastomer for use in the present invention, the ratio (tan δ=G"[200° C., 100 Hz]/G'[200° C., 100 Hz]) between storage modulus (G'[200° C., 100 Hz]) and loss modulus (G"[200° C., 100 Hz]) measured at 200° C. and 100 Hz by dynamic viscoelasticity measurement is in a specific range, whereby when a filament composed of the thermoplastic elastomer containing at least the component (A) is used, excellent moldability is exhibited in molding by a material extrusion 3D printer.

Here, the loss modulus (G"[200° C., 100 Hz]) in tan δ is an indicator indicating the viscosity, and the storage modulus (G'[200° C., 100 Hz]) is an indicator indicating the elasticity. Namely, for achieving good moldability in molding by a material extrusion 3D printer, it is important that the viscoelasticity of the thermoplastic elastomer for use in the present invention is in a specific range.

Incidentally, since the filament for 3D printer molding of the present invention is suitably molded at a temperature of usually about 200° C., and the measurement temperature of those indicators, which is 200° C., has meaning as physical properties contributing to moldability at that temperature.

Figure 1:
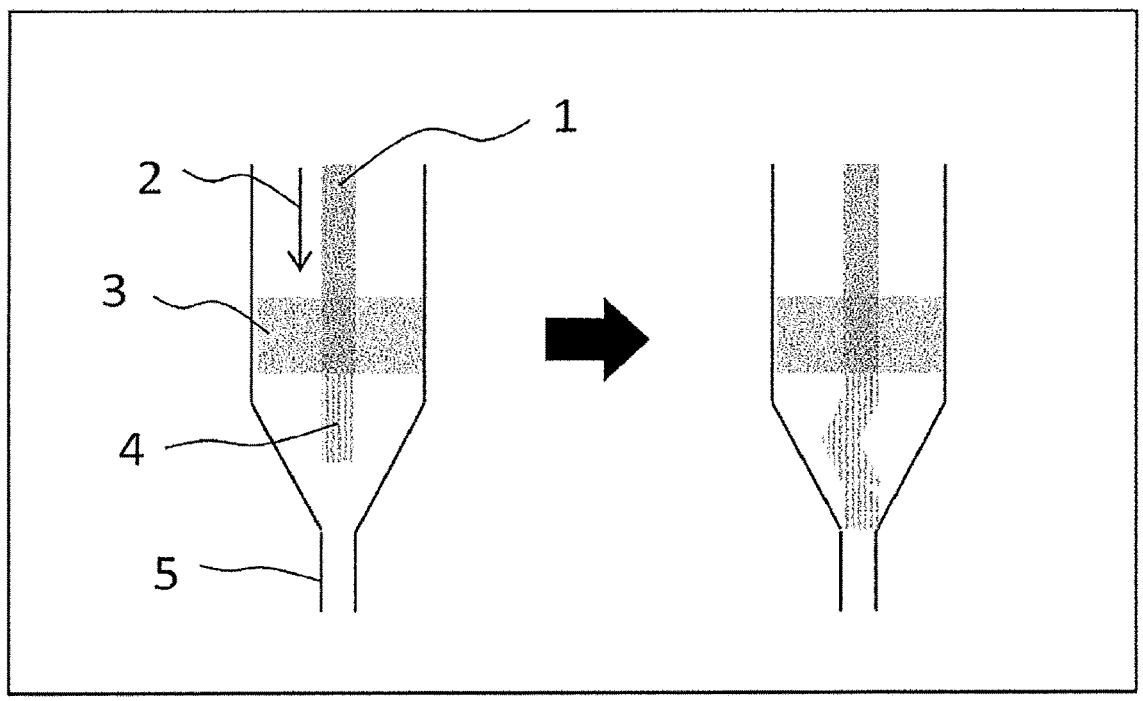
FIG. 1 is a conceptual diagram at the time when a filament composed of a thermoplastic elastomer having tan δ of less than 0.50 is extruded by a material extrusion 3D printer.
Figure 2:
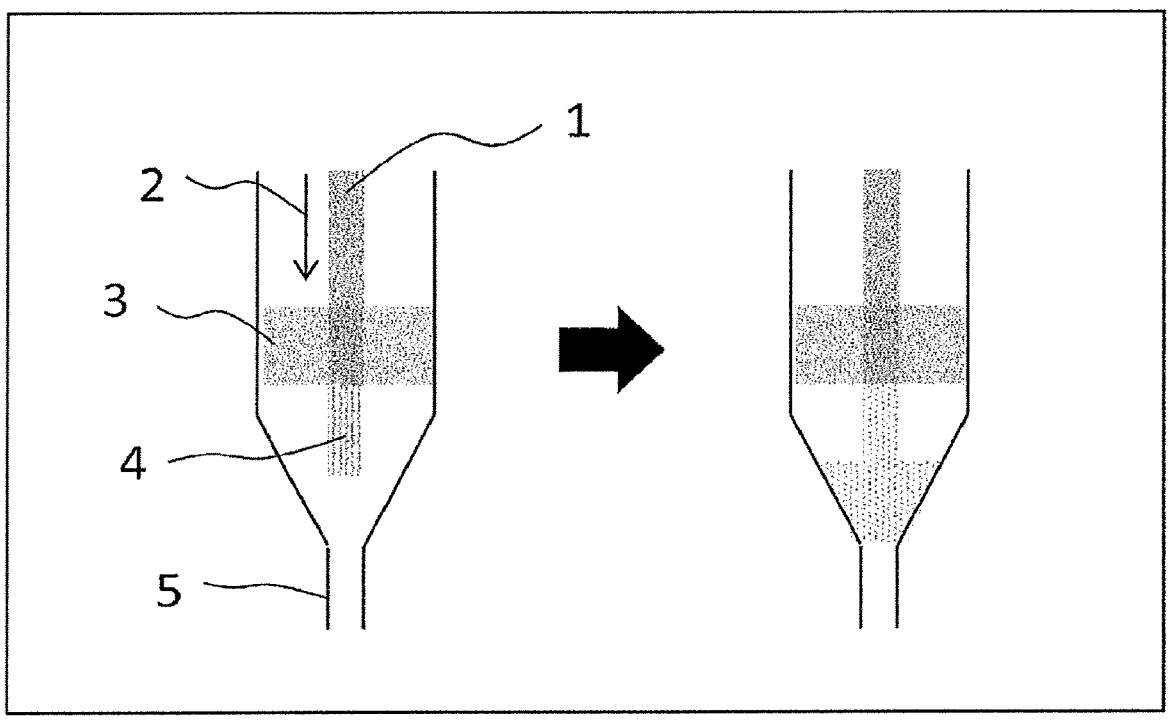
FIG. 2 is a conceptual diagram at the time when a filament composed of a thermoplastic elastomer having tan δ of more than 2.50 is extruded by a material extrusion 3D printer.

The tan δ of the thermoplastic elastomer for use in the present invention is from 0.50 to 2.50. FIG. 1 depicts a conceptual diagram at the time when a filament composed of a thermoplastic elastomer having tan δ of less than 0.50 is extruded by a material extrusion 3D printer. In addition, FIG. 2 depicts a conceptual diagram at the time when a filament composed of a thermoplastic elastomer having tan δ of more than 2.50 is extruded by a material extrusion 3D printer. As illustrated in FIG. 1, a filament 1 is extruded in the extrusion direction 2, heated in a heating part 3 to make a molten resin 4, and extruded from a nozzle 5.

As illustrated in FIG. 1, if the value of tan δ of the thermoplastic elastomer is less than 0.50, it is presumed that at the time of extruding the molten resin 4 inside the material extrusion 3D printer, an excessive load is applied between the nozzle 5 and the molten resin 4, which makes extrusion of the molten resin 4 difficult.

On the other hand, as illustrated in FIG. 2, if the value of tan δ of the thermoplastic elastomer is more than 2.50, it is presumed that at the time of extruding the molten resin 4 inside the material extrusion 3D printer, an adequate load is not applied to the molten resin 4, which makes extrusion of the molten resin 4 difficult.

The thermoplastic elastomer for use in the present invention contains at least the component (A) and preferably contains the components (B) and (C), and the present invention is based on the finding that for the moldability of a filament composed of such a thermoplastic elastomer in molding by a material extrusion 3D printer, the viscoelasticity of the thermoplastic elastomer is important.

From these points of view, tan δ is preferably 0.60 or more, more preferably 0.70 or more, and on the other hand, is preferably 2.30 or less, more preferably 2.10 or less, still more preferably 1.90 or less, and yet still more preferably 1.70 or less.

In the molding above, from the viewpoint of obtaining appropriate viscoelasticity when the thermoplastic elastomer is melted, G'[200° C., 100 Hz] is preferably $5.0 \times 10^3$ Pa or more, more preferably $7.5 \times 10^3$ Pa or more, still more preferably $1.0 \times 10^4$ Pa or more. In addition, G'[200° C., 100 Hz] is preferably $1.0 \times 10^5$ Pa or less, more preferably $7.5 \times 10^4$ Pa or less, and still more preferably $5.0 \times 10^4$ Pa or less.

For the same reason, G"[200° C., 100 Hz] is preferably $2.5 \times 10^3$ Pa or more, more preferably $5.0 \times 10^3$ Pa or more, and still more preferably $7.5 \times 10^3$ Pa or more. In addition, G"[200° C., 100 Hz] is preferably $2.5 \times 10^5$ Pa or less, more preferably $7.5 \times 10^4$ Pa or less, and still more preferably $5.0 \times 10^4$ Pa or less.

In the thermoplastic elastomer, as the content of each of the components (A) and (C) is larger or as the weight average molecular weight (Mw) of the component (A) is higher, the elasticity property more develops, and the value of tan δ tends to be larger. In the thermoplastic elastomer, as the content of the component (B) is larger, the viscosity property more develops, and the value of tan δ tends to be smaller. The value of tan δ of the thermoplastic elastomer can be controlled by appropriately adjusting these factors.

In the thermoplastic elastomer for use in the present invention, the storage modulus (G'[30° C., 1 Hz]) measured at 30° C. and 1 Hz by dynamic viscoelasticity measurement is preferably from $1.0 \times 10^4$ to $5.0 \times 10^7$ Pa. When the storage modulus (G'[30° C., 1 Hz]) is from $1.0 \times 10^4$ to $5.0 \times 10^7$ Pa, the flexibility of the filament for material extrusion 3D printer molding around the normal temperature (from 20 to 30° C.) is improved, and the filament is less likely to bend at the time of insertion into a 3D printer head, so that excellent supply stability can be achieved. From these points of view, G'[30° C., 1 Hz] is more preferably $3.0 \times 10^4$ Pa or more, and still more preferably $5.0 \times 10^4$ Pa or more, and on the other hand, is more preferably $2.0 \times 10^7$ Pa or less, and still more preferably $1.0 \times 10^7$ Pa or less.

Here, as the content of each of the component (A) and the later-described component (B) in the thermoplastic elastomer is larger or as the content of the later-described component (C) is smaller, the value of G'[30° C., 1 Hz] tends to be smaller. Accordingly, G'[30° C., 1 Hz] can be controlled to the above-described suitable range by appropriately adjusting the contents of the components (A) to (C) in the thermoplastic elastomer.

Furthermore, in the thermoplastic elastomer for use in the present invention, the storage modulus (G'[200° C., 1 Hz]) measured at 200° C. and 1 Hz by dynamic viscoelasticity measurement is preferably $2 \times 10^4$ Pa or less, since flowability of the filament for material extrusion 3D printer molding around the molding temperature is improved and at the time of molding by a material extrusion 3D printer, supply of strand from the head and feed of filament within the head are facilitated.

In particular, for controlling the amount of the resin extruded from the head and more improving the moldability, G'[200° C., 1 Hz] is preferably 5.0 Pa or more, and still more preferably $1.0 \times 10$ Pa or more, and on the other hand, is preferably $1.0 \times 10^4$ Pa or less, and more preferably $8.0 \times 10^3$ Pa or less.

As the molecular weight of the component (A) used in the thermoplastic elastomer is smaller or as the value of ODT (order-disorder transition temperature) of the component (A)

is lower, the value of G'[200° C., 1 Hz] tends to be smaller. Accordingly, G'[200° C., 1 Hz] of the thermoplastic elastomer can be controlled to the above-described preferable range by appropriately selecting the kind of the component (A) used in the thermoplastic elastomer with reference to the weight average molecular weight (Mw) or ODT value of the component.

In addition, when the ratio (G'[30° C., 1 Hz]/G'[200° C., 1 Hz]) between G'[30° C., 1 Hz] and G'[200° C., 1 Hz] of the thermoplastic elastomer for use in the present invention is from $5.0 \times 10^{-1}$ to $5.0 \times 10^6$, the filament for material extrusion 3D printer molding is well balanced between the flexibility around the normal temperature (from 20 to 30° C.) and the flowability around the molding temperature, and an excellent filament for material extrusion 3D printer molding, having good balance in terms of insertability of filament into the material extrusion 3D printer head, ease of feed of the filament within head, and supply of strand from the head, can be obtained.

From these points of view, G'[30° C., 1 Hz]/G'[200° C., 1 Hz] is more preferably 1.0 or more, still more preferably 5.0 or more, yet still more preferably $1.0 \times 10$ or more, and most preferably $2.0 \times 10^2$ or more. On the other hand, this value is more preferably $2.0 \times 10^6$ or less, still more preferably $1.0 \times 10^6$ or less, yet still more preferably $9.0 \times 10^5$ or less, and most preferably $8.0 \times 10^5$ or less.

The G'[200° C., 100 Hz], G"[200° C., 100 Hz], G'[30° C., 1 Hz] and G'[200° C., 1 Hz] of the thermoplastic elastomer can be specifically measured by the method described in the paragraph of EXAMPLES later.

In the thermoplastic elastomer for use in the present invention, the melt flow rate (MFR) at 190° C. under a load of 1.20 kgf based on ISO 1133 is preferably from 1 to 400 g/10 min. MFR of the thermoplastic elastomer is preferably not less than the lower limit above, since the extrusion load tends to become low, which facilitates the molding. On the other hand, it is preferably that MFR is not more than the upper limit above, since the diameter of extruded stand is likely to be stabilized.

From this point of view, MFR of the thermoplastic elastomer for use in the present invention is more preferably 1.5 g/10 min or more, and still more preferably 2 g/10 min or more. On the other hand, MFR of the thermoplastic elastomer for use in the present invention is more preferably 350 g/10 min or less, still more preferably 300 g/10 min or less, and particularly preferably 250 g/10 min or less.

The thermoplastic elastomer for use in the present invention and the filament for 3D printer molding composed of the elastomer have flexibility. Specifically, these can be measured for at least either one of durometer D hardness (JIS K6253-1993) and durometer A hardness (JIS K6253-1993), and those satisfying the following conditions are preferred.

The durometer hardness is expressed by a numerical value indicated when an indenter attached to the tip of a spring is pushed against the resin surface, and is classified into durometer D hardness and durometer A hardness by the shape of indenter and the difference of spring. While the durometer D hardness is used for a harder region, the durometer A hardness is used for a softer region, and there exists an overlap region of a region where the value of durometer D hardness is small and a region where the value of A hardness is large.

In view of moldability with a material extrusion 3D printer and the tactile impression of the molded body obtained, the durometer D hardness is preferably 60 or less. From the same viewpoint, the durometer D hardness is preferably 50 or less, and more preferably 40 or less, and the durometer A hardness is preferably 90 or less, more preferably 85 or less, and still more preferably 80 or less.

On the other hand, in order to facilitate insertion of the filament for material extrusion 3D printer molding into the extrusion head at the time of performing molding by a material extrusion 3D printer, the durometer A hardness is preferably 10 or more. From this point of view, the durometer A hardness is more preferably 20 or more, and still more preferably 30 or more.

In the thermoplastic elastomer for use in the present invention, the order-disorder transition temperature (ODT) is preferably 100° C. or more, more preferably 120° C. or more, and still more preferably 140° C. or more, and on the other hand, is preferably 260° C. or less, more preferably 250° C. or less, and still more preferably 240° C. or less.

The range above is preferred in view of flowability and moldability within the head at the time of molding by a material extrusion 3D printer. The order-disorder transition temperature (ODT) is a value determined as a point where the relationship (G'/ω) of frequency (ω) and storage modulus (G') becomes 2 when the storage modulus is measured for each temperature, and can be determined by the above-described solid viscoelasticity measurement. The value of the order-disorder transition temperature (ODT) tends to be smaller as the molecular weight of the component (A) is lower or tends to be smaller as the blending amount of the component (B) is larger.

[Component (A)]

The component (A) for use in the present invention is at least one block copolymer out of the group consisting of a block copolymer containing at least either one of a polymer block derived from a vinyl aromatic compound (hereinafter, sometimes referred to as "block P") and a polymer block derived from conjugated diene and isobutylene (hereinafter, sometimes referred to as "block Q"), and a block copolymer obtained by hydrogenating the block copolymer.

The component (A) is preferably at least one block copolymer out of the group consisting of a block copolymer having a polymer block P mainly composed of a structural unit derived from a vinyl aromatic compound and a polymer block Q mainly composed of a structural unit derived from conjugated diene and/or isobutylene, and a block copolymer obtained by hydrogenating the block copolymer (sometimes referred to as "styrene block copolymer"). Here, the "mainly composed of" in the component (A) means that the content of the structural unit is 50% by weight or more.

In the component (A), although the vinyl aromatic compound of the monomer constituting the block P is not particularly limited, styrene or a styrene derivative such as α-methyl styrene is preferable. Among these, it is preferable to be mainly composed of styrene. In the block P, a monomer other than a vinyl aromatic compound may be contained as a raw material.

The monomer other than a vinyl aromatic compound in the block P includes ethylene, α-olefin, etc. In the case where the block P contains, as a raw material, the monomer other than a vinyl aromatic compound, the content thereof is usually less than 50% by weight, and preferably 40% by weight or less. When the content of the monomer other than a vinyl aromatic compound is in this range, the heat resistance tends to be improved.

Although the conjugated diene of the monomer constituting the block Q is not particularly limited, it is preferable to be mainly composed of at least either one of butadiene and isoprene. In the block Q, a monomer other than a conjugated diene may be contained as a raw material.

The monomer other than a conjugated diene includes isobutylene, styrene, etc. In the case where the block Q contains, as a raw material, the monomer other than a conjugated diene, the content thereof is usually less than 50% by weight, preferably 40% by weight or less. When the content of the monomer other than a conjugated diene is in this range, the flexibility tends to be improved.

The component (A) may be a hydrogenated block copolymer obtained by hydrogenating the above-described styrene block copolymer, more specifically, may be hydrogenated block copolymer obtained by hydrogenating a double bond present in the block Q of the block copolymer. Although the hydrogenation rate of the block Q is not particularly limited, it is preferably from 80 to 100% by weight, more preferably from 90 to 100% by weight.

When the block Q is hydrogenated in the range above, the obtained thermoplastic elastomer tends to be decreased in the viscous property and increased in the elastic property. The same applies to the case where the block P uses a diene component as a raw material. The hydrogenation rate can be measured by $^{13}$C-NMR.

Although the component (A) for use in the present invention is not particularly limited as long as its structure has at least one polymer block P and at least one polymer block Q, and the structure may be any of linear, branched, radial, etc., a structure having at least two polymer blocks P and at least one polymer block Q is preferred.

In particular, the component (A) is preferably a block copolymer represented by the following formula (I) or (II). Furthermore, the block copolymer represented by the following formula (I) or (II) is preferably a hydrogenated block copolymer obtained by hydrogenation. In the case where the copolymer represented by the following formula (I) or (II) is a hydrogenated block copolymer, the thermal stability is improved.

$$P\text{-}(Q\text{-}P)_m \quad (I)$$

$$(P\text{-}Q)_n \quad (II)$$

(In the formulae, P represents the polymer block P, Q represents the polymer block Q, m represents an integer of 1 to 5, and n represents an integer of 2 to 5).

In the formula (I) or (II), m and n are preferably large from the viewpoint of decreasing the order-disorder transition temperature (ODT) as a rubbery high polymer but are preferably small in view of ease of production and cost.

The block copolymer and/or hydrogenated block copolymer (hereinafter, sometimes referred to as "(hydrogenated) block copolymer") is preferably a (hydrogenated) block copolymer represented by formula (I) rather than a (hydrogenated) block copolymer represented by formula (II) because of excellent rubber elasticity, more preferably a (hydrogenated) block copolymer represented by formula (I) where m is 3 or less, still more preferably a (hydrogenated) block copolymer represented by formula (I) where m is 2 or less, and most preferably a (hydrogenated) block copolymer represented by formula (I) where m is 1.

Although the proportions by weight of block P and block Q constituting the component (A) are arbitrary, in view of mechanical strength of the thermoplastic elastomer for use in the present invention, the proportion of block P is preferably larger and on the other hand, in view of flexibility, the proportion of block P is preferably smaller.

The proportion by weight of the block P in the component (A) is preferably 10% by weight or more, more preferably 15% by weight or more, still more preferably 30% by weight or more, and is preferably 70% by weight or less, more preferably 60% by weight or less, still more preferably 50% by weight or less.

The styrene content in the component (A) is preferably 10% by weight or more, more preferably 15% by weight or more, and still more preferably 30% by weight or more, and is preferably 70% by weight or less, more preferably 60% by weight or less, and still more preferably 50% by weight or less.

The production method of the component (A) in the present invention may be any method as long as the above-described structure and physical properties are obtained, and the method is not particularly limited. Specifically, the component can be obtained by performing block polymerization in an inert solvent with use of a lithium catalyst, etc. by the method described, for example, in JP-B-S40-23798.

The hydrogenation of the block copolymer may be performed in an inert solvent in the presence of a hydrogenation catalyst by the method described, for example, in JP-B-S42-8704, JP-B-S43-6636, JP-A-S59-133203 or JP-A-S60-79005. In the hydrogenation treatment here, it is preferable to hydrogenate 50% or more, more preferably 80% or more, of the olefinic double bond in the polymer block and at the same time, hydrogenate 25% or less of the aromatic unsaturated bond in the polymer block.

Although the number average molecular weight (Mn) of the block copolymer of the component (A) in the present invention is not particularly limited, it is preferably 30,000 or more, more preferably 40,000 or more, and still more preferably 50,000 or more, and is preferably 500,000 or less, more preferably 400,000 or less, and still more preferably 300,000 or less. When the number average molecular weight of the component (A) is in the range above, the moldability and heat resistance tend to be improved.

The weight average molecular weight (Mw) of the block copolymer of the component (A) is not particularly limited but is preferably 35,000 or more, more preferably 45,000 or more, and still more preferably 55,000 or more, and is preferably 550,000 or less, more preferably 400,000 or less, still more preferably 300,000 or less, and yet still more preferably 200,000 or less. The weight average molecular weight of the component (A) is preferably in the range above, since the moldability and heat resistance tend to be improved and in addition, control of the value of tan δ is facilitated.

In the present invention, the weight average molecular weight (Mw) and number average molecular weight (Mn) of the block copolymer of the component (A) are a value in terms of polystyrene as determined by gel permeation chromatography (GPC) measurement, and the measurement conditions therefor are as follows.

(Measurement Conditions)

Instrument: "HLC8120 GPC", manufactured by Tosoh Corporation

Column: "TSKgel Super HM-M", manufactured by Tosoh Corporation

Detector: differential refractive index detector (RI detector/built-in)

Solvent: chloroform

Temperature: 40° C.

Flow velocity: 0.5 mL/min

Injection amount: 20 µL

Concentration: 0.1% by weight

Calibration reference: monodisperse polystyrene

Calibration method: polystyrene conversion

The block copolymer of the component (A) is available as a commercial product. Examples of the commercial product include, as a hydrogenated block copolymer, "Kraton (registered trademark)-G" series produced by Kraton Corporation, "SEPTON (registered trademark)" series and "HYBRAR (registered trademark)" series produced by Kuraray Co., Ltd., and "Tuftec (registered trademark)" series produced by Asahi Kasei Chemicals Corporation. The commercial product of the non-hydrogenated block copolymer includes "Kraton (registered trademark)-A" series produced by Kraton Corporation, "HYBRAR (registered trademark)" series produced by Kuraray Co., Ltd., "Tufprene (registered trademark)" series produced by Asahi Kasei Chemicals Corporation, etc.

[Component (B)]

The thermoplastic elastomer for use in the present invention preferably contains, as the component (B), a softening agent for hydrocarbon rubber. The component (B) contributes to softening the thermoplastic elastomer and enhancing the flexibility, elasticity, processability and flowability.

The softening agent for hydrocarbon rubber includes a mineral oil softening agent, a synthetic resin softening agent, etc., but in view of affinity for other components, a mineral oil softening agent is preferred. The mineral oil softening agent is generally a mixture of aromatic hydrocarbon, naphthenic hydrocarbon and paraffinic hydrocarbon, and a material in which 50% or more of all carbon atoms are paraffinic hydrocarbon, a material in which from 30 to 45% of all carbon atoms are naphthenic hydrocarbon, and a material in which 35% or more of all carbon atoms are aromatic hydrocarbon, are called a paraffinic oil, a naphthenic oil, and an aromatic oil, respectively. Among these, in the present invention, a paraffinic oil is preferably used. As to the softening agent for hydrocarbon rubber, only one softening agent may be used, or two or more softening agents may be used in any combination and an arbitrary ratio.

Although the kinetic viscosity at 40° C. of the softening agent for hydrocarbon rubber of the component (B) is not particularly limited, it is preferably 20 cSt or more, and more preferably 50 cSt or more, and is preferably 800 cSt or less, and more preferably 600 cSt or less. The flash point (COC method) of the softening agent for hydrocarbon rubber is preferably 200° C. or more, and more preferably 250° C. or more.

The softening agent for hydrocarbon rubber of the component (B) is available as a commercial product. The relevant commercial product includes, for example, "Nisseki Polybutene (registered trademark) HV" series produced by JX Nippon Oil & Energy Corporation, and Diana (registered trademark) "Process Oil PW" series produced by Idemitsu Kosan Co., Ltd., and a relevant product appropriately selected from these commercial products may be used.

The thermoplastic elastomer for use in the present invention preferably contains from 30 to 400 parts by weight of the component (B) per 100 parts by weight of the component (A). From the viewpoint of more improving the flowability and controlling the value of tan δ, the content of the component (B) is preferably in the range above.

From these points of view, the content of the component (B) is, per 100 parts by weight of the component (A), more preferably 45 parts by weight or more, and still more preferably 60 parts by weight or more, and on the other hand, is more preferably 350 parts by weight or less, still more preferably 300 parts by weight or less, yet still more preferably 250 parts by weight or less, and most preferably 200 parts by weight or less.

[Component (C)]

The thermoplastic elastomer for use in the present invention preferably further contains a polyolefin resin as the component (C), in addition to the components (A) and (B). By using a polyolefin resin of the component (C), an effect of, for example, imparting flowability during molding of the thermoplastic elastomer, imparting heat resistance, or adjusting the flexibility according to the shape, etc. of the molded body, can be obtained.

Although the polyolefin resin of the component (C) is not particularly limited, it includes, for example, a low density polyethylene homopolymer, a high density polyethylene homopolymer, an ethylene.α-olefin copolymer, a propylene homopolymer, a propylene.ethylene copolymer, a propylene.α-olefin copolymer, an ethylene-methacrylic acid copolymer, and a polymer obtained by modifying the polymer above with an acid anhydride, etc. to impart a polar functional group.

Among these, the polyolefin resin is preferably a propylene resin and/or a polyethylene resin. The "polypropylene resin" as used herein means a resin containing, as a structural unit, more than 50% by weight of a structural unit derived from propylene, and the "polyethylene resin" means a resin containing, as a structural unit, more than 50% by weight of a structural unit derived from ethylene.

As the polypropylene resin, a propylene homopolymer or a copolymer of propylene, ethylene and/or α-olefin having a carbon number of 4 to 12 is preferably used. In view of moldability, the melt flow rate (MFR) of the polypropylene resin measured at 230° C. under a load of 2.16 kgf based on ISO 1133 is preferably from 1.0 to 150 g/10 min, and more preferably from 2.0 to 100 g/10 min In view of moldability, the melt flow rate (MFR) of the polyethylene resin measured under 2.16 kgf based on ISO 1133 is preferably from 1.0 to 150 g/10 min, and more preferably from 2.0 to 100 g/10 min. In addition, in view of heat resistance, the density of the polyethylene resin is preferably from 0.910 to 0.980 g/cm$^3$, and more preferably from 0.915 to 0.975 g/cm$^3$.

As the component (C), although either a polypropylene resin or a polyethylene resin may be used, or both may be used in combination, it is preferable to contain a polypropylene resin. Furthermore, two or more polypropylene resins or two or more polyethylene resins, which are differing in physical properties or kind, may be used in combination.

The polyolefin resin of the component (C) is available as a commercial product. The polypropylene resin includes, for example, NOVATEC (registered trademark) PP series and WINTEC (registered trademark) series produced by Japan Polyethylene Corporation, and a relevant product appropriately selected from these commercial products may be used. The polyethylene resin includes, for example, NOVATEC (registered trademark) series produced by Japan Polyethylene Corporation and CREOLEX produced by Asahi Kasei Chemicals Corporation, and a relevant product appropriately selected from these commercial products may be used.

The thermoplastic elastomer for use in the present invention preferably contains from 10 to 300 parts by weight of the component (C) per 100 parts by weight of the component (A). The blending amount of the component (C) relative to the component (A) is preferably not more than the upper limit above, since the hardness as the thermoplastic elastomer does not become excessively high and the soft texture of the obtained molded body is enhanced. On the other hand, the blending amount is preferably not less than the lower limit above, since the hardness as the thermoplastic elastomer does not become excessively low and molding is facilitated.

From the viewpoint of more successfully bringing out these effects, the blending amount of the component (C) is, per 100 parts by weight of the component (A), more preferably 15 parts by weight or more, and still more preferably 20 parts by weight or more, and on the other hand, is more preferably 250 parts by weight or less, and still more preferably 200 parts by weight or less. From the viewpoint of controlling the value of tan δ as well, the content of the component (C) is preferably in the range above.

[Other Components]

In the thermoplastic elastomer for use in the present invention, as long as the object of the present invention is not impaired, components other than the components (A) to (C), for example, other resins or rubber, an additive or a filler, may be appropriately blended, if desired.

Other resins include, for example, a polyester resin, a polyamide resin, a styrene resin, an acrylic resin, a polycarbonate resin, a polyvinyl chloride resin, and various elastomers (among these, however, those coming under the component (A) for use in the present invention are excluded). Only one of these resins may be used, or two or more thereof may be used in combination. The blending amount of other resins is usually 50% by weight or less, and preferably 30% by weight or less, based on all components.

The additive includes, for example, an antioxidant, an acidic compound and derivatives thereof, a lubricant, an ultraviolet absorber, a light stabilizer, a nucleating agent, a flame retardant, an impact modifier, a blowing agent, a coloring agent, an organic peroxide, and an inorganic additive, spreading agent, pressure-sensitive adhesive, etc. for increasing the frictional resistance between a filament and an engaging part during molding by a material extrusion 3D printer. Only one of these additives may be used, or two or more thereof may be used in combination.

The filler includes, for example, an inorganic filler such as talc, calcium carbonate, zinc carbonate, wollastonite, silica, alumina, magnesium oxide, calcium silicate, sodium aluminate, calcium aluminate, sodium aluminosilicate, magnesium silicate, glass balloon, cut glass fiber, milled glass fiber, glass flake, glass powder, silicon carbide, silicon nitride, gypsum, gypsum whisker, calcined kaolin, carbon black, zinc oxide, antimony trioxide, zeolite, hydrotalcite, metal fiber, metal whisker, metal powder, ceramic whisker, potassium titanate, boron nitride, graphite and carbon fiber; and an organic filler, e.g., a naturally occurring polymer such as starch, fine cellulose particle, wood flour, tofu refuse, rice hull and bran, and modifications thereof. Only one of these fillers may be used, or two or more thereof may be used in combination. The blending amount of the filler is usually 50% by weight or less, and preferably 30% by weight or less, based on all components.

[Production Method of Thermoplastic Elastomer]

The thermoplastic elastomer for use in the present invention can be produced by mechanically mixing the components (A) to (C) and other components blended as needed by a known method, for example, a Henschel mixer, a V-blender or a tumbler blender, and then mechanically melt-kneading the mixture by a known method. For the mechanical melt-kneading, a general melt-kneading machine such as Banbury mixer, various kneaders and single-screw or twin-screw extruder may be used.

[Filament for Material Extrusion 3D Printer Molding]

The filament for material extrusion 3D printer molding of the present invention is produced by using the above-described thermoplastic elastomer for use in the present invention. The method for producing the filament for material extrusion 3D printer molding of the present invention is not particularly limited, but the filament can be usually obtained, for example, by a method of molding the thermoplastic elastomer for use in the present invention by a known molding method such as extrusion molding, or a method of directly forming a filament at the time of production of the thermoplastic elastomer. For example, in the case of obtaining the filament for material extrusion 3D printer molding of the present invention by extrusion molding, the conditions therefor are usually from 80 to 250° C., preferably from 100 to 230° C.

The diameter of the filament for material extrusion 3D printer molding of the present invention depends on the capacity of the system used but is preferably from 1.0 to 5.0 mm, and more preferably from 1.3 to 3.5 mm. Furthermore, in view of stability of raw material supply, the margin of error in the diameter accuracy is preferably within ±5% relative to an arbitrary measurement point on the filament.

In producing a molded body with a material extrusion 3D printer by using the filament for material extrusion 3D printer molding of the present invention, it is required to stably store the filament for material extrusion 3D printer molding and stably supply the filament for material extrusion 3D printer molding to a material extrusion 3D printer.

Accordingly, from the aspect of, e.g., long-term storage, stable delivery, protection from environmental factors such as moisture, and prevention of twisting, it is preferred that the filament for material extrusion 3D printer molding of the present invention is hermetically sealed and packaged in the form of a roll by wounding the filament on a bobbin or the roll is housed in a cartridge.

The cartridge includes a cartridge having a structure where a desiccant or absorbent is used in the inside, in addition to a roll wound on a bobbin, and the portion except for at least an orifice part for delivering out the filament is hermetically sealed.

In particular, the water content of the filament for 3D printer molding is preferably 3,000 ppm or less, and more preferably 2,500 ppm or less. In addition, the product of the filament for 3D printer molding is preferably sealed hermetically such that the water content of the filament becomes 3,000 ppm or less, and more preferably 2,500 ppm or less.

Furthermore, the filament surface is preferably treated or coated with an antiblocking agent so as to prevent blocking (fusion) of filaments with each other at the time of forming a roll from the filament for material extrusion 3D printer molding.

Examples of the antiblocking agent that can be used here include a silicon antiblocking agent, an inorganic filler such as talc, and a fatty acid metal salt. Only one of these antiblocking agents may be used, or two or more thereof may be used in combination.

A preferable form of the filament is a roll wound on a bobbin, etc., and in addition, a cartridge for a material extrusion 3D printer, prepared by housing the filament in a container, is preferred. In particular, the cartridge prepared by housing a roll of the filament in a container is disposed inside or around a material extrusion 3D printer, and a filament is always and continuously introduced into a material extrusion 3D printer from the cartridge during molding.

[Production Method of Molded Body]

The method for producing a molded body of the present invention is characterized in that a filament composed of a thermoplastic elastomer which contains at least the component (A) and in which the ratio (tan δ=G"[200° C., 100 Hz]/G'[200° C., 100 Hz]) between storage modulus (G'[200° C., 100 Hz]) and loss modulus (G"[200° C., 100 Hz]) measured at 200° C. and 100 Hz by dynamic viscoelasticity measurement is from 0.50 to 2.50, is used and the filament is molded by a material extrusion 3D printer.

Here, the thermoplastic elastomer used is the same as that described above as the preferred embodiment of the thermoplastic elastomer for use in the present invention. The method for producing a molded body of the present invention is a method of supplying the thermoplastic elastomer to a material extrusion 3D printer and molding it to obtain a molded body.

A material extrusion 3D printer generally has a heatable substrate, an extrusion head disposed, a heating and melting vessel, and a raw material supply part including a filament guide, filament-mounting part, etc. In some material extrusion 3D printers, an extrusion head and a heating and melting vessel are integrated together in the inside.

The extrusion head is disposed in a gantry structure and can thereby be arbitrarily moved over the X-Y plane of the substrate. The substrate is a platform for building a target 3D object, a supporting material, etc. and preferably has a specification where an adhesion to a laminated material is achieved by heating and keeping warm and the dimensional stability as a desired 3D object of the obtained molded body can be improved. Usually, at least either one of the extrusion head and the substrate is movable in the Z-axis direction which is perpendicular to the X-Y plane.

The raw material is delivered from the raw material supply part, fed to the extrusion head with a pair of facing rollers or gears, heated and melted in the extrusion head, and extruded from the nozzle at the end. The extrusion head supplies the raw material onto the substrate and deposits it layer-by-layer with changing the position in accordance with signals sent based on a CAD model. After the completion of this step, the layer-by-layer deposited material is removed from the substrate and subjected to, if desired, separation of the supporting material, etc. or trimming of unnecessary portions, and a molded body as the desired 3D object can thereby be obtained.

Examples of the means for continuously supplying the raw material to the extrusion head include a method where a filament or a fiber is delivered out and supplied, a method where a powder or a liquid is supplied from a tank, etc. via a constant feeder, and a method where a material obtained by plasticizing pellets or granules by means of an extruder, etc. is extruded and supplied. Among these, in view of step simplicity and supply stability, a method of delivering out and supplying a filament, i.e., the above-described filament for 3D printer molding of the present invention, is most preferred.

In the case of supplying a filament-like raw material, from the aspect of, e g, stable delivery, protection from environmental factors such as moisture, and prevention of twisting, the filament is preferably wound on a bobbin and housed in a cartridge.

In the case of supplying a filament-like raw material, the filament is generally engaged with a driving roll such as nip roll or gear roll and supplied to the extrusion head with being drawn out. Here, in order to stabilize the raw material supply by enhancing the gripping due to engagement of the filament with the driving roll, it is also preferable to transfer minute irregularities beforehand to the filament surface or incorporate an inorganic additive, a spreading agent, a pressure-sensitive adhesive, rubber, etc. for increasing the frictional resistance between the filament and the engaging part.

The thermoplastic elastomer used as the filament of the present invention usually requires a temperature of approximately from 180 to 250° C. for providing flowability appropriate to extrusion and thus has a wide applicable temperature region, in comparison with a raw material that has been conventionally used in molding by a 3D printer, so that in the production method of the present invention, a molded body can be stably produced by setting the heating/extrusion head temperature to be preferably from 205 to 240° C. and the substrate temperature to be usually 80° C. or less, preferably from 60 to 70° C.

The temperature of the molten resin discharged from the extrusion head is preferably 180° C. or more, and more preferably 190° C. or more, and on the other hand, is preferably 250° C. or less, and more preferably 240° C. or less.

The temperature of the molten resin is preferably not less than the lower limit above from the viewpoint of extruding a resin having high heat resistance, and this is also preferred from the viewpoint of preventing deleterious change of appearance because of remaining of a fragment in the modeled product due to a phenomenon of the molten metal being thinly elongated, which is generally called cobwebbing. On the other hand, the temperature of the molten resin is preferably not more than the upper limit above, because it is likely that occurrence of a trouble of the resin, such as pyrolysis, burning, smoking, odor emission or sticking, is prevented and the resin can be discharged at a high speed to improve the modeling efficiency.

The molten resin discharged from the extrusion head is discharged in a strand shape having a diameter of preferably from 0.01 to 1 mm, more preferably from 0.02 to 0.8 mm. The molten resin is preferably discharged in such a shape, because reproducibility of a CAD model tends to be improved.

The molded body produced by the method for producing a molded body of the present invention is excellent in terms of soft texture, heat resistance, etc. Accordingly, the molded body can be suitably used for applications, for example, stationery; toys; covers of cellular phones, smartphones, etc.; parts such as grip; school educational materials; repair parts for domestic electrical appliances or OA equipment; various parts for automobiles, motorcycles, bicycles, etc.; and members such as building material.

Examples

Although the contents of the present invention are described more specifically below by referring to Examples, the present invention should not be construed as limited by these Examples as long as its gist is observed. The values of the various production conditions and evaluation results in the following Examples have a meaning as a preferable upper or lower limit value in the embodiments of the present invention, and a preferable range may be a range defined by a combination of the above-described upper or lower limit value and the value in Examples or by a combination of the values in Examples.

[Raw Material]
<Component (A)>
A-1:
Kraton (registered trademark) G1650 produced by Kraton Corporation [a hydrogenated styrene.butadiene.styrene block copolymer, styrene content: 30% by weight, hydrogenation rate of butadiene: 100% by weight, number average molecular weight (Mn): 80,000, weight average molecular weight (Mw): 90,000] A-2:
Kraton (registered trademark) A1536 produced by Kraton Corporation [a hydrogenated styrene.butadiene.styrene block copolymer, styrene content: 42% by weight, hydrogenation rate of butadiene: 100% by weight, number average molecular weight (Mn): 110,000, weight average molecular weight (Mw): 130,000] A-3:

Kraton (registered trademark) G1651 produced by Kraton Corporation [a hydrogenated styrene.butadiene.styrene block copolymer, styrene content: 33% by weight, hydrogenation rate of butadiene: 100% by weight, number average molecular weight (Mn): 200,000, weight average molecular weight (Mw): 250,000]

<Component (B)>
B-1:
Diana (registered trademark) Process Oil PW90 produced by Tdemitsu Kosan Co., Ltd. [paraffinic oil, kinematic viscosity (40° C.): 90 cSt, flash point (COC method): 266° C.]

<Component (C)>
C-1:
NOVATEC PP MG03BD produced by Japan Polyethylene Corporation [propylene-ethylene random copolymer, MFR [ISO 1133 (230° C., load: 2.16 kgf)]: 30 g/10 min]

<For Comparative Example>
X-1:
Urethane thermoplastic elastomer fiber ("NINJAFLEX (registered trademark)", produced by FENNER DRIVES, Inc., USA Examples 1 to 4 and Comparative Examples 1 to 3

[Production of Thermoplastic Elastomer]

Respective components described in Blending composition of Table-1 were melt-kneaded by a twin-screw kneader (cylinder temperature: from 160 to 210° C.) to produce thermoplastic elastomer pellets (Examples 1 to 4 and Comparative Examples 1 and 2).

[Preparation of Molded Body for Evaluation of Physical Properties]

The thermoplastic elastomer pellet obtained above was subjected to injection molding at a mold temperature of 40° C., an injection pressure of 147 MPa and a cylinder temperature of 210° C. by using an injection molding machine ("J110AD" manufactured by The Japan Steel Works, LTD., mold clamping force: 110T) to obtain a molded body of 100 mm×100 mm and 2 mm in thickness (Examples 1 to 4 and Comparative Examples 1 and 2).

As for the urethane thermoplastic elastomer fiber ("NINJAFLEX (registered trademark)", produced by FENNER DRIVES, Inc., USA), press molding was conducted at a temperature of 220° C. and a pressing pressure of 10 MPa for a pressing time of 3 minutes by using a pressing machine, and a molded body of 100 mm×100 mm and 2 mm in thickness was thereafter obtained (Comparative Example 3).

Hereinafter, these are referred to as "molded body for evaluation of physical properties".

[Production of Filament for Material Extrusion 3D Printer Molding]

Using the thermoplastic elastomer pellet, continuous fibers having a cross-sectional diameter of 1.75 mm were produced by extrusion molding (Examples 1 to 4 and Comparative Examples 1 and 2).

[Evaluation Method]
<MFR>
With respect to the thermoplastic elastomer pellets and urethane thermoplastic elastomer fiber ("NINJAFLEX (registered trademark)", produced by FENNER DRIVES, Inc., USA), MFR (ISO 1133 (190° C., load: 1.20 kgf)) was measured.

<Durometer A Hardness>
With respect to the molded body for evaluation of physical properties prepared above, the durometer A hardness was measured in conformity with ISO 7619-1.

<Storage Modulus>
A test piece of 25 mm (diameter)×2 mm (thickness) was cut out by means of a punching blade from the molded body for evaluation of physical properties prepared above and measured for the storage modulus (G'[200° C., 100 Hz]) and loss modulus (G"[200° C., 100 Hz]) at 200° C. and a frequency of 100 Hz, the storage modulus (G'[30° C., 1 Hz]) at 30° C. and a frequency of 1 Hz, and the storage modulus (G'[200° C., 1 Hz]) at 200° C. and a frequency of 1 Hz by using a solid viscoelasticity measuring apparatus (RSA3, manufactured by TA Instruments Japan Inc.).

<Shaping Properties>
Molding was performed with using, as a raw material, the filaments for material extrusion 3D printer molding of Examples 1 to 4 and Comparative Examples 1 and 2 and the urethane thermoplastic elastomer fiber of Comparative Example 3. As the extrusion layer-by-layer deposition system by the fused deposition modeling method, "BLADE-1", manufactured by Hotproceed, was used, and as the 3D object, molding of a cup-shaped molded body (3D modeled product) having an opening at the upper end was performed.

The production conditions were set to a standard mode and a printer speed of 60 mm/sec and in addition, the production was performed at a discharge temperature of 215° C. by setting the substrate temperature to 60° C. The molten resin was discharged in the shape of a strand with a diameter of 0.4 mm from the extrusion head.

The moldability in this molding, the presence or absence of cobwebbing of the molded body obtained, etc. were observed and evaluated according to the following criteria. The "cobwebbing" as used herein means that a fragment due to a phenomenon of the molten metal being thinly elongated remains to cause deleterious change in the appearance.

A: No cobwebbing occurs during modeling and fine modeling can be achieved.

B: Cobwebbing occurs during modeling and fine modeling cannot be achieved.

C: Sufficient discharge of molten resin is not obtained and molding cannot be performed.

CC: The molten resin is not extruded, although its discharge can be confirmed, and molding cannot be performed.

TABLE 1

|  |  |  |  | Example | | | | Comparative Example | | |
|---|---|---|---|---|---|---|---|---|---|---|
|  |  |  |  | 1 | 2 | 3 | 4 | 1 | 2 | 3 |
| Thermoplastic elastomer | Blending composition [parts by weight] | Component (A) | A-1 | 100 | 100 | — | — | — | — | — |
|  |  |  | A-2 | — | — | 100 | 100 | — | 100 | — |
|  |  |  | A-3 | — | — | — | — | 100 | — | — |
|  |  | Component (B) | B-1 | 80 | 133 | 150 | 200 | 80 | 300 | — |
|  |  | Component (C) | C-1 | 50 | 100 | 80 | 100 | 80 | 100 | — |
|  |  | TPU | X-1 | — | — | — | — | — | — | 100 |

TABLE 1-continued

|  |  |  |  | Example | | | | Comparative Example | | |
| --- | --- | --- | --- | --- | --- | --- | --- | --- | --- | --- |
|  |  |  |  | 1 | 2 | 3 | 4 | 1 | 2 | 3 |
|  | Physical properties | G'[200° C., 100 Hz] | Pa | $4.7 \times 10^4$ | $3.9 \times 10^4$ | $1.4 \times 10^4$ | $1.2 \times 10^4$ | $1.3 \times 10^5$ | $2.6 \times 10^3$ | $8.7 \times 10^4$ |
|  |  | G"[200° C., 100 Hz] | Pa | $4.5 \times 10^4$ | $3.0 \times 10^4$ | $2.1 \times 10^4$ | $1.9 \times 10^4$ | $5.3 \times 10^4$ | $7.2 \times 10^3$ | $5.8 \times 10^4$ |
|  |  | tan δ |  | 0.96 | 0.78 | 1.50 | 1.58 | 0.41 | 2.77 | 1.50 |
|  |  | G'[200° C., 1 Hz] | Pa | $4.6 \times 10^3$ | $2.7 \times 10^3$ | $1.1 \times 10^2$ | $7.5 \times 10$ | $4.6 \times 10^4$ | $1.8 \times 10$ | $4.5 \times 10^3$ |
|  |  | G'[30° C., 1 Hz] | Pa | $1.7 \times 10^6$ | $4.7 \times 10^6$ | $3.3 \times 10^6$ | $1.6 \times 10^6$ | $6.1 \times 10^6$ | $1.3 \times 10^6$ | $3.7 \times 10^6$ |
|  |  | G'[30° C., 1 Hz]/G'[200° C., 1 Hz] |  | $3.7 \times 10^2$ | $1.8 \times 10^3$ | $3.0 \times 10^4$ | $2.2 \times 10^4$ | $1.3 \times 10^2$ | $7.2 \times 10^3$ | $8.2 \times 10^2$ |
|  |  | Durometer A hardness |  | 74 | 82 | 70 | 70 | 80 | 55 | 90 |
|  |  | MFR [190° C., load: 1.20 kg] | g/10 min | 2.5 | 16 | 200 | 300≤ | 0 | 300≤ | 0 |
| Filament for material extrusion 3D printer molding | Evaluation | Moldability (discharge temperature: 215° C.) |  | A | A | A | A | C | CC | B |

\* In the blending composition, "—" indicates that the component is not used.
\* "TPU" indicates a urethane thermoplastic elastomer.

It is seen from Table-1 that according to the present invention, a molded body can be obtained with good moldability without excessively raising the temperature of extrusion processing by a material extrusion 3D printer. Furthermore, the molded body obtained in each of Examples 1 to 4 had soft and good texture and excellent transparency.

On the other hand, in Comparative Example 1, since the value of tan δ of the thermoplastic elastomer was large, the moldability was bad, and in Comparative Example 2, since the value of tan δ of the thermoplastic elastomer was small, the moldability was bad. In Comparative Example 3 where the range of tan δ was the same as that of the thermoplastic elastomer for use in the present invention but a urethane thermoplastic elastomer which does not contain the component (A) was used, the moldability was poor compared to Examples 1 to 4.

While the invention has been described in detail and with reference to specific embodiments thereof, it will be apparent to one skilled in the art that various changes and modifications can be made therein without departing from the spirit and scope of the invention. This application is based on Japanese Patent Application (Patent Application No. 2015-085994) filed on Apr. 20, 2015, the entirety of which is incorporated herein by way of reference.

INDUSTRIAL APPLICABILITY

According to the filament for material 3D printer molding of present invention, a molded body excellent in heat resistance, soft texture, etc. can be obtained. The molded body produced by the present invention can be suitably used for applications, for example, stationery; toys; covers of cellular phones, smartphones, etc.; parts such as grip; school educational materials; repair parts for domestic electrical appliances or OA equipment; various parts for automobiles, motorcycles, bicycles, etc.; and members such as building material.

The invention claimed is:

1. A filament for material extrusion 3D printer molding, comprising:
   a thermoplastic elastomer comprising at least one block copolymer selected from the group consisting of a first block copolymer comprising a polymer block P including 50% by weight or more of a structural unit derived from a vinyl aromatic compound and a polymer block Q including 50% by weight or more of a structural unit derived from conjugated diene and/or isobutylene, and a second block copolymer obtained by hydrogenating the first block copolymer,
   wherein a ratio tan δ=Gδ[200° C., 100 Hz]/G'[200° C., 100 Hz] between storage modulus G'[200° C., 100 Hz] and loss modulus G"[200° C., 100 Hz] of the thermoplastic elastomer measured at 200° C. and 100 Hz by dynamic viscoelasticity measurement is from 0.50 to 2.50.

2. The filament according to claim 1, wherein the thermoplastic elastomer further comprises
   a softening agent capable of softening the thermoplastic elastomer.

3. The filament according to claim 2, wherein the softening agent is included in an amount of from 30 to 400 parts by weight per 100 parts by weight of the at least one block copolymer.

4. The filament according to claim 1, wherein the thermoplastic elastomer further comprises
   a polyolefin resin.

5. The filament according to claim 4, wherein the polyolefin resin comprises a polypropylene resin.

6. The filament according to claim 4, wherein the polyolefin resin is included in an amount of from 10 to 300 parts by weight per 100 parts by weight of the at least one block copolymer.

7. The filament according to claim 1, wherein the filament has a diameter of from 1.0 to 5.0 mm.

8. The filament according to claim 1, wherein storage modulus G'[30° C., 1 Hz] of the thermoplastic elastomer measured at 30° C. and 1 Hz by dynamic viscoelasticity measurement is from $1 \times 10^4$ to $5 \times 10^7$ Pa.

9. The filament according to claim 8, wherein storage modulus G'[200° C., 1 Hz] of the thermoplastic elastomer measured at 200° C. and 1 Hz by dynamic viscoelasticity measurement is $2 \times 10^4$ Pa or less.

10. The filament according to claim 9, wherein G'[30° C., 1 Hz]/G'[200° C., 1 Hz] of the thermoplastic elastomer is from $5 \times 10^{-1}$ to $5 \times 10^6$.

11. The filament according to claim 1, wherein a melt flow rate (MFR) of the thermoplastic elastomer at 190° C. under a load of 1.20 kgf based on ISO 1133 is from 1 to 400 g/10 min.

12. The filament according to claim 1, wherein a durometer A hardness of the thermoplastic elastomer is 90 or less.

13. A roll of the filament according to claim 1.

14. A cartridge for material extrusion 3D printer molding, comprising:
a container in which the filament according to claim 1 is housed.

15. A method for producing a molded article, the method comprising:
molding the filament according to claim 1 with a material extrusion 3D printer.

16. A method for producing a molded article, the method comprising:
molding the filament according to claim 2 with a material extrusion 3D printer.

17. A method for producing a molded article, the method comprising:
molding the filament according to claim 3 with a material extrusion 3D printer.

18. A method for producing a molded article, the method comprising:
molding the filament according to claim 4 with a material extrusion 3D printer.

19. A method for producing a molded article, the method comprising:
molding the filament according to claim 5 with a material extrusion 3D printer.

20. A method for producing a molded article, the method comprising:
molding the filament according to claim 6 with a material extrusion 3D printer.

21. The method according to claim 15, wherein the filament has a diameter of from 1.0 to 5.0 mm.

22. A method for producing a molded article, the method comprising:
molding the filament according to claim 8 with a material extrusion 3D printer.

23. A method for producing a molded article, the method comprising:
molding the filament according to claim 9 with a material extrusion 3D printer.

24. A method for producing a molded article, the method comprising:
molding the filament according to claim 10 with a material extrusion 3D printer.

25. A method for producing a molded article, the method comprising:
molding the filament according to claim 11 with a material extrusion 3D printer.

26. A method for producing a molded article, the method comprising:
molding the filament according to claim 12 with a material extrusion 3D printer.

27. The method according to claim 15, wherein the filament is molded such that a temperature of a molten resin discharged from an extrusion head of the material extrusion 3D printer is from 180 to 250° C.

28. The method according to claim 15, wherein the molding by the material extrusion 3D printer is based on a fused deposition modeling method.

29. The method according to claim 15, wherein the molding by the material extrusion 3D printer is performed by discharging a molten resin from an extrusion head in a strand shape with a diameter of 0.01 to 1 mm.

30. The filament according to claim 1, wherein the at least one block copolymer comprises a hydrogenated styrene-butadiene-styrene block copolymer.

* * * * *